(12) United States Patent
Podmore

(10) Patent No.: US 11,700,115 B2
(45) Date of Patent: Jul. 11, 2023

(54) QUANTUM KEY DISTRIBUTION SYSTEM

(71) Applicant: Honeywell Limited Honeywell Limitée, Mississauga (CA)

(72) Inventor: Hugh Podmore, Toronto (CA)

(73) Assignee: Honeywell Limited Honeywell Limitée, Mississauga (CA)

(*) Notice: Subject to any disclaimer, the term of this patent is extended or adjusted under 35 U.S.C. 154(b) by 0 days.

(21) Appl. No.: 17/835,461

(22) Filed: Jun. 8, 2022

(65) Prior Publication Data
US 2023/0040824 A1  Feb. 9, 2023

(30) Foreign Application Priority Data

Aug. 5, 2021  (CA) ................................ CA 3126975

(51) Int. Cl.
H04B 10/00 (2013.01)
H04L 9/08 (2006.01)
H04B 10/70 (2013.01)
H04J 14/00 (2006.01)

(52) U.S. Cl.
CPC ........... H04L 9/0858 (2013.01); H04B 10/70 (2013.01)

(58) Field of Classification Search
CPC ..................................................... H04B 10/70
See application file for complete search history.

(56) References Cited

U.S. PATENT DOCUMENTS 7,668,214 B2  2/2010  Wilson et al.
7,742,512 B2  6/2010  Spariosu et al.
7,756,424 B2  7/2010  Turpin et al.
2016/0204570 A1  7/2016  Huber et al.
2016/0218869 A1*  7/2016  Wabnig ................. H04L 9/0858
2022/0206360 A1*  6/2022  Perumangatt .......... H04B 10/70

FOREIGN PATENT DOCUMENTS

WO  2012105930 A2  8/2012
WO  2013/032954 A1  3/2013

OTHER PUBLICATIONS

Vallone et al., "Free-space quantum key distribution by rotation-invariant twisted photons", Physical Review Letters, 2014, 113(6): 060503 (pp. 1-8).

* cited by examiner

*Primary Examiner* — Daniel G Dobson
(74) *Attorney, Agent, or Firm* — Bereskin & Parr LLP/S.E.N.C.R.L., s.r.l.; Isis E. Caulder; T. Cameron Gale

(57) ABSTRACT

An optical transmitter for quantum key distribution includes a plurality of spatially separated light sources configured to emit a light signal with the same wavelength. Each light source emits a light signal with a unique encoding. A beam combiner receives the light signals from the plurality of light sources and combines the received light signals into a combined light signal. A spatial filter is optically coupled to the beam combiner and includes an aperture that receives the combined light signal and emits a filtered light signal. The aperture has an aperture diameter less than or equal to the specified wavelength. A collimator is optically coupled to the spatial filter and receives the filtered light signal and emits a collimated light signal. An output aperture receives the collimated light signal and outputs the collimated light signal as an output light signal towards an optical receiver.

20 Claims, 4 Drawing Sheets

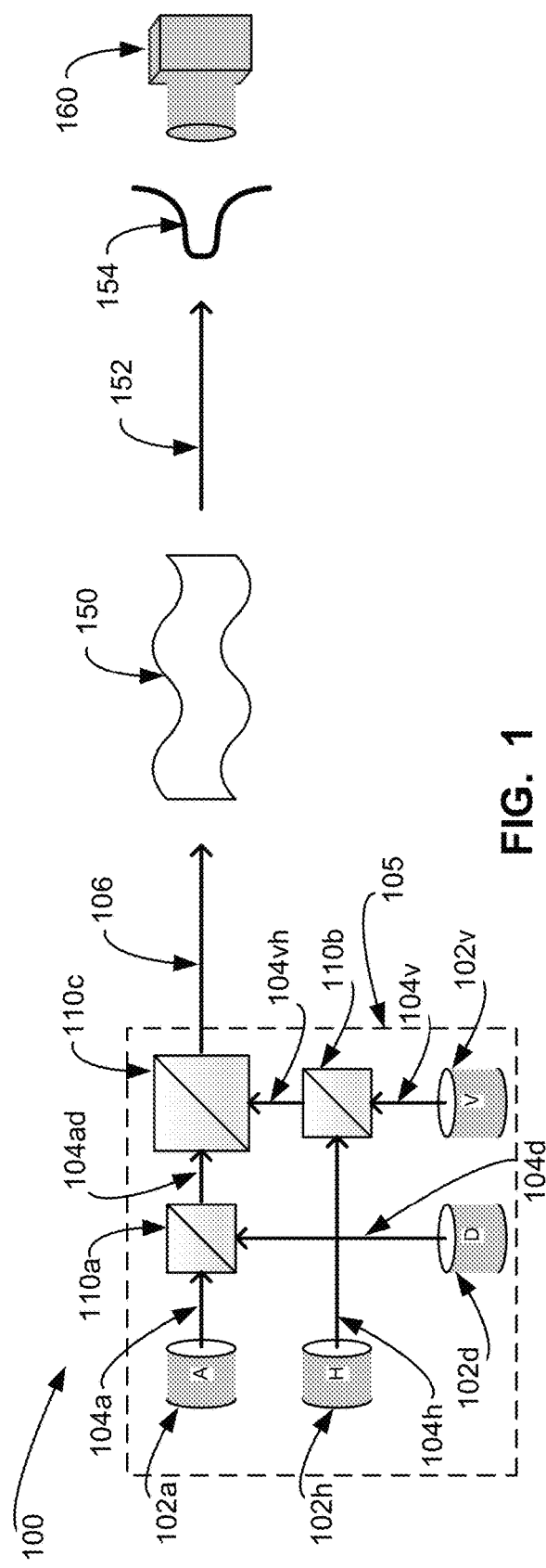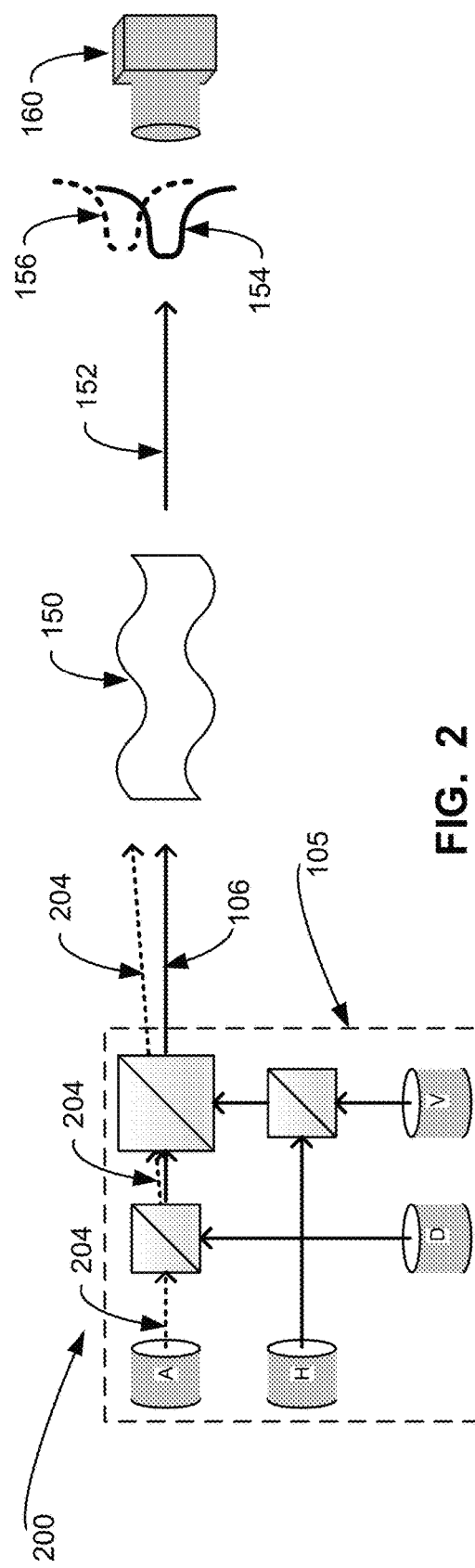

QUANTUM KEY DISTRIBUTION SYSTEM

FIELD

The present subject-matter relates to quantum key distribution, and more particularly to optical quantum key distribution systems and methods.

INTRODUCTION

The following is not an admission that anything discussed below is part of the prior art or part of the common general knowledge of a person skilled in the art.

Quantum key distribution is a technique that allows communicating parties to establish a shared secret encryption key. This shared secret key may be used to encrypt and decrypt messages transmitted between the parties. Quantum key distribution uses a cryptographic protocol that relies on aspects of quantum mechanics. This protocol involves data being encoded in quantum states (also referred to as qubits). When the encoded data is transmitted between communicating parties, it can be subject to a variety of attacks.

Quantum key distribution systems may use free-space optical communication (e.g. the transmission of optical signals over free-space) to transmit information for the generation of a shared secret key and/or secure encryption keys. These optical communication systems may be subject to a variety of attacks from malicious parties attempting to "listen in" on the information being exchanged in order to gain information relating to the qubit exchange which would compromise the security of the encryption key being created. Accordingly, it is desirable for quantum key distribution systems and methods to protect against attacks by malicious parties in order to maintain the security of the encryption keys being created.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

Quantum key distribution systems often use photons to encode data in quantum states. Data encoded on photons may be subject to eavesdropping attacks which take advantage of encoded photon states that are spatially distinguishable or distinguishable based on intensity.

In accordance with this disclosure, systems and methods are provided that may prevent side-channel attacks based on spatially and/or amplitude distinguishable photon states. An optical transmitter can include a plurality of light sources. The light sources can be spatially separated. Each light source is configured to emit a light signal (e.g. a pulse of light) with a unique encoding (e.g. polarization state, time-bin state, etc.). The light signals from the plurality of light sources are combined into a combined light signal. This combined light signal is directed to a spatial filter. The spatial filter has an aperture with a diameter that is less than or equal to the wavelength of the light signals from the light sources. The spatial filter can output a filtered light signal where the signal components (e.g. the individual light pulses) corresponding to each light source are spatially indistinguishable. This enables the optical transmitter to provide spatially indistinguishable encoded light signals while avoiding the complexity of precisely aligning the optical components for multiple light sources.

The filtered light signal can be collimated and transmitted to an optical receiver while preventing attacks based on spatially distinguishable light signals. The amplitude of light emitted by the light sources can also be adjusted to prevent the light signals from being distinguishable based on amplitude. Adjusting the amplitude of light emitted by each light source may be much simpler than precisely aligning the optics for multiple light sources as would be necessary for a system with a spatial filter of diameter larger than the transmitted wavelength.

In an aspect of this disclosure, there is provided an optical transmitter configured for quantum key distribution, the optical transmitter comprising: a plurality of light sources, each light source configured to emit a corresponding light signal with the same specified wavelength, wherein each light source is configured to emit the corresponding light signal with a unique encoding; a beam combiner optically coupled to the plurality of light sources, the beam combiner arranged to receive the light signals from the plurality of light sources and to combine the received light signals into a combined light signal; a spatial filter optically coupled to the beam combiner, the spatial filter including an aperture arranged to receive the combined light signal and to emit a filtered light signal, wherein the aperture has an aperture diameter less than or equal to the specified wavelength; a collimator optically coupled to the spatial filter, the collimator configured to receive the filtered light signal and to emit a collimated light signal; and an output aperture configured to receive the collimated light signal and to output the collimated light signal as an output light signal towards an optical receiver.

In some examples, the unique encoding may include at least one of a different polarization or a different time-bin.

In some examples, the spatial filter may be one of a pinhole filter or a graded intensity mask. The pinhole filter may be a circular pinhole filter. The graded intensity mask may be an apodized Gaussian intensity mask.

In some examples, the optical transmitter may be configured to output the output light signal as a sequence of light pulses.

In some examples, the sequence of light pulses includes an average number of photons per light pulse, wherein the average number of photons per light pulse may be at most one photon per light pulse.

In some examples, the sequence of light pulses may be defined to include a plurality of signal light pulses and a plurality of decoy light pulses.

In some examples, the sequence of light pulses may include a signal average number of photons per signal light pulse and a decoy average number of photons per decoy light pulse, where the signal average number is different from the decoy average number.

In some examples, the optical transmitter may be configured to transmit the sequence of light pulses with each light pulse indistinguishable from each other light pulse both spatially and by amplitude.

In some examples, the spatial filter may be configured to receive the combined light signal as a combined plane wave or Gaussian beam and to convert the combined light signal into a sequence of spherical waves originating at the spatial filter.

In some examples, the spherical waves may be spatially indistinguishable.

In some examples, a relative amplitude of the corresponding light signals emitted by the plurality of light sources may be adjustable.

In some examples, an absolute amplitude of each light source may be adjustable.

In some examples, the optical transmitter may include a processor and a photoreceptor operable to monitor an amplitude of the filtered light signal corresponding to each light source and to adjust the amplitude of the plurality of light sources based on the monitored amplitude. The photoreceptor may be a photodiode.

In some examples, the optical transmitter may include optical baffling coupled to the spatial filter, where the optical baffling is configured to limit a divergence of the filtered light signal emitted by the spatial filter.

In some examples, the optical transmitter may include a secondary spatial filter optically coupled between the spatial filter and the collimator.

In some examples, the aperture of the spatial filter may be manufactured using lithographic patterning and etching of an optically reflective or absorptive surface on a substrate.

In some examples, the optical transmitter may be configured to output the collimated light signal towards the optical receiver through free space.

In accordance with an aspect of this disclosure, there is provided a key distribution method comprising: emitting a plurality of light signal pulses, wherein each light signal pulse is emitted with a corresponding encoding and the plurality of light signal pulses includes signal pulses with at least four different corresponding encodings, and wherein each light signal pulse is emitted with the same wavelength; combining the plurality of light signal pulses into a combined pulse sequence; filtering the combined pulse sequence through a spatial filter having an aperture diameter that is less than or equal to the specified wavelength to generate a filtered light signal sequence; and collimating the filtered light signal sequence into a collimated pulse sequence.

In some examples, the method may include transmitting the collimated pulse sequence towards an optical receiver as an output pulse sequence.

In some examples, the method may include adjusting a power of the plurality of light sources to provide a desired average number of photons per pulse in the output pulse sequence.

In some examples, the method may include adjusting a power of the plurality of light sources to provide a desired average number of photons per pulse in the collimated pulse sequence.

In some examples, the method may include monitoring an average number of photons per pulse in the output pulse sequence and adjusting the power of one or more light sources in order to maintain the average number of photons per pulse at a desired average number of photons per pulse.

In some examples, the method may include monitoring an average number of photons per pulse in the collimated pulse sequence and adjusting the power of one or more light sources in order to maintain the average number of photons per pulse at a desired average number of photons per pulse.

In some examples, the desired average number of photons per pulse may be 0.5 photons per pulse.

In some examples, the output pulse sequence may be defined to include a plurality of signal light pulses and a plurality of decoy light pulses.

In some examples, the desired average number of photons may include a desired signal average number of photons per signal light pulse and a desired decoy average number of photons per decoy light pulse, where the desired signal average number is different from the desired decoy average number.

In some examples, the desired average number of photons per pulse may include multiple levels for "signal" and "decoy" states, (e.g. 0.5 "signal" photons per pulse and 0.1 "decoy" photons per pulse).

In some examples, the corresponding encoding for at least some of the light pulses may be at least one of a corresponding polarization state or a corresponding time-bin.

In accordance with an aspect of this disclosure, there is provided an optical transmitter for quantum key distribution comprising a plurality of light emitting elements, a plurality of beam-combining elements, at least one focusing and collimating element and a spatial filter of diameter less than or equal to the wavelength of light emitted by the light sources.

In accordance with an aspect of this disclosure, there is provided an optical transmitter comprising: a plurality of light sources, each light source configured to emit a corresponding light signal with the same specified wavelength, wherein each light source is configured to emit the corresponding light signal with a unique encoding; and a spatial filter having a filter aperture with a diameter less than or equal to the specified wavelength; wherein the optical transmitter is configured to output a plurality of pulses of light that are generated by the light sources and directed through the spatial filter, wherein the plurality of pulses of light average at most one photon per pulse.

In accordance with an aspect of this disclosure, there is provided an optical transmitter configured to output a plurality of pulses of light, wherein the plurality of pulses of light average at most one photon per pulse, wherein each pulse of light has the same specified wavelength, and each pulse of light has an associated encoding, and the optical transmitter is configured to direct the pulses of light through a spatial filter having an aperture diameter less than the specified prior to outputting the plurality of pulses of light.

It will be appreciated by a person skilled in the art that a system, device, method or computer program product disclosed herein may embody any one or more of the features contained herein and that the features may be used in any particular combination or sub-combination. Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIG. 1 is a block diagram illustrating an example of a known optical transmission system;

FIG. 2 is a block diagram illustrating another example of a known optical transmission system;

DESCRIPTION OF VARIOUS EMBODIMENTS

Figure 3:
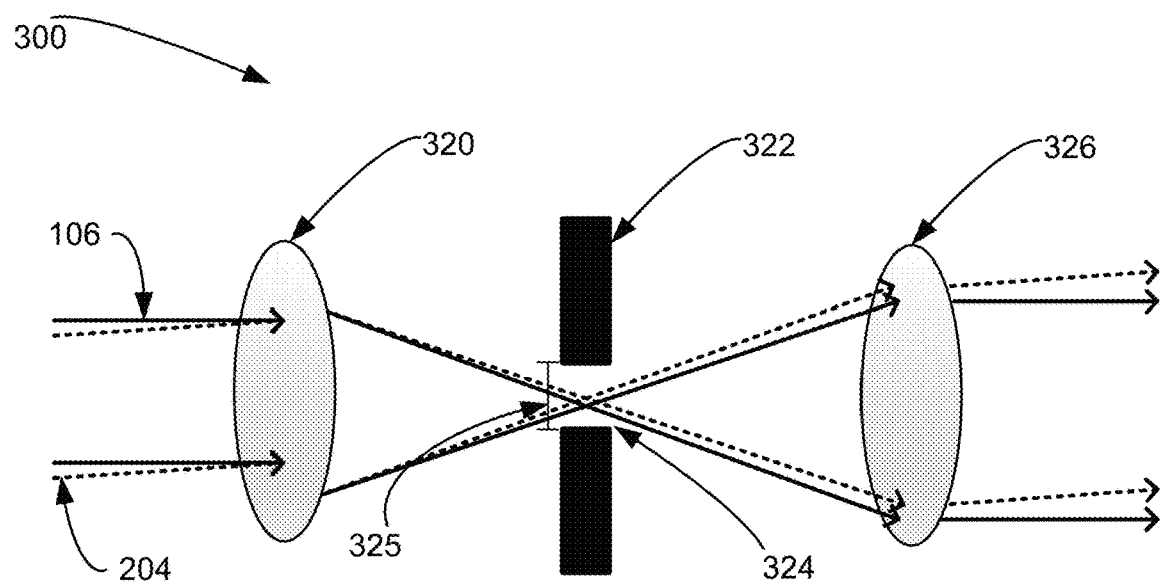
FIG. 3 is a block diagram illustrating an example of a spatial filter that may be used with the optical transmission systems of FIG. 1 or FIG. 2.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

In the description and drawings herein, reference may be made to a Cartesian co-ordinate system in which the vertical direction, or z-axis, extends in an up and down orientation from bottom to top. The x-axis extends in a first horizontal or width dimension perpendicular to the z-axis, and the y-axis extends cross-wise horizontally relative to the x-axis in a second horizontal or length dimension.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

Some elements herein may be identified by a part number, which is composed of a base number followed by an alphabetical or alphanumerical suffix (e.g. 104*a*, or 104*ad*). Multiple elements herein may be identified by part numbers that share a base number in common and that differ by their suffixes (e.g. 104*a*, 104*h*, and 104*d*). All elements with a common base number may be referred to collectively or generically using the base number without a suffix (e.g. 104).

Quantum key distribution involves a series of encoded signals communicated between a transmitter and a receiver. The encoded signals are defined to enable the transmitter and receiver to establish a shared secret key. This key can be used to encrypt and decrypt data that is communicated between the transmitter and receiver. In optical quantum key distribution systems, optical signals can be encoded to transmit information usable to generate of secure encryption keys. For example, photons encoded with specific photon states can be used as the encoded signals.

Free-space optical quantum key distribution systems rely on optical communication over free space (e.g. the transmission of optical signals over free space). Quantum key distribution systems, including free-space optical quantum key distribution systems, may be subject to a variety of attacks by third parties attempting to intercept and decode the information being exchanged. These third parties may attempt to gain information that would comprise the security of an encryption key being exchanged between the transmitter and the intended receiver.

The types of attacks that may be available to a malicious third party can vary depending on the nature of the quantum key distribution system. For example, free-space quantum key distribution systems (as opposed to fiber-based distribution systems) may be subject to attacks derived from quantum sources (i.e. signal transmission sources) in which the photon states are spatially distinguishable.

Referring to FIGS. 1 and 2, shown therein are examples of quantum key distribution systems 100 and 200. The quantum key distribution systems 100 and 200 include examples of light signal sources that may be used in various quantum key distribution systems. As shown in FIGS. 1 and 2, a combined signal source 105 can be configured to generate a combined light signal 106. The combined light signal 106 may be transmitted to an optical receiver 160 (although the combined light signal may be directed through additional optical components prior to being output).

The combined light signal 106 can include a sequence of light signal components (e.g. light pulses) that are defined to convey information to the optical receiver 160. The signal components in the combined light signal 106 may be encoded to allow the exchange of a shared secret key between an optical transmission system and the optical receiver 160.

As shown in the example of FIGS. 1 and 2, the combined light signal 106 (appropriately modified by any subsequent optics) can be transmitted to an optical receiver 160 through a free space optical link 150. Free space optical (FSO) links (such as link 150) allow for exchange of data across air mediums and vacuums. FSO links may be deployed, for example, to facilitate exchange of data between satellites, satellites and stationary and/or mobile ground terminals, various ground terminals, various airborne objects (e.g., aircrafts) as well as between satellites and either airborne objects or ground terminals.

The combined signal source 105 illustrated in FIGS. 1 and 2 is a simplified example of components of an optical transmitter that can be used to transmit encoded signals in a quantum key distribution system. As shown in FIG. 1, the combined signal source 105 can include a plurality of light sources 102. The light sources 102 may be provided using various types of light sources such as lasers (e.g. laser diodes) and/or light emitting diodes, and/or other light sources such as light sources that depend on non-linear methods of generating photons (e.g. spontaneous parametric down-conversion, four-wave-mixing, etc.) for example.

As shown in the example of FIG. 1, the light sources 102 can be spatially separated light sources. In general, embodiments described herein can include two or more spatially separated light sources 102.

In the example illustrated, four light sources 102 are provided. However, it should be understood that a different number of light sources 102 may be used in examples of optical transmitters and quantum key distribution systems described herein. In general, a minimum of four signal states (and thus light sources providing four uniquely encoded light states) may be required for quantum key distribution systems such as those described herein. However, additional signal channels may also be used in examples of optical transmitters and quantum key distribution systems described herein. For example, some quantum key distribution systems have been proposed including upwards of 32 signal states (i.e. 32 different signal encodings).

The plurality of light sources 102 can be configured to emit light signals 104 having the same wavelength. This may ensure that the encoded light signals cannot be differentiated by a third-party on the basis of the corresponding signal wavelength.

A light source 102 may define a transmission channel that emits a light signal with a signal encoding specific to that channel. That is, each light source 102 may be configured to emit a corresponding light signal with a unique encoding (i.e. a distinct or otherwise distinguishable encoding that is used for only that channel or light source 102). Each light source 102 can be configured to emit a corresponding light signal pulse that has the associated encoding.

In some examples, a light source 102 may be configured to emit light signal pulses with different encodings (e.g. a light source may continuously and/or randomly cycle through output states).

In the example shown in FIG. 1, each light source 102 may be configured to emit a corresponding light signal with a specific polarization state. The specific polarization state for a particular light source 102 (or a particular transmission state) may be unique (i.e. only associated with) that particular light source 102 (or particular transmission state). Alternately or in addition, light sources 102 may be configured to encode corresponding light signals using different encoding techniques. For example, the light sources 102 may be configured to encode corresponding light signals using time bin encoding. Alternately or in addition, the light sources 102 may be configured to encode corresponding light signals using phase encoding. Alternately or in addition, the light sources may be configured to use a combination of signal encodings (e.g. two polarization encoded light sources in conjunction with two time-bin encoded light sources etc.).

The combined signal source 105 illustrates an example signal source configured to transmit light signals in linearly polarized optical states, where each light signal source 102 emits a light signal that differs in its angle of polarization (e.g. vertical, horizontal, diagonal, anti-diagonal). For example, the first light source 102v emits a light signal 104v in a vertically polarized state, the second light source 102d emits a light signal 104d in a diagonally polarized state, the third light source 102h emits a light signal 104h in a horizontally polarized state, the fourth light source 102a emits a light signal 104a in an anti-diagonal polarized state. Alternately, other types of polarization may be used such as circular polarization (e.g. a right hand circular polarization state and a left-hand circular polarization state) so long as the states are orthogonal to each other.

The plurality of light sources 102 can be configured to emit corresponding light signals that are encoded in order to transmit data enabling a receiver to derive a shared secret (e.g. an encryption key). For instance, a random number generator may be used to activate a single light source within the transmitter at each time point in which an output pulse is required. This randomly selected sequence of pulses makes up the data which is transmitted to the receiver. In some cases, the random number generator may be defined to generate random numbers using a pseudo-random digital random number generator. Preferably, however, the random number generator may be defined to generate random numbers based on a naturally occurring phenomenon such as radioactive decay.

A beam combiner can be optically coupled to the light sources 102. The light signals from the light sources 102 can be transmitted through the beam combiner in order to combine the light signals into a combined light signal. The beam combiner may output a combined light signal that is collimated or substantially collimated. The beam combiner can be generally provided using one or more optical elements configured for beam-combining functions, such as polarizing beam combiners, waveplates, and non-polarizing beam combiners for example.

In the example illustrated, the beam combiner includes a plurality of beam combining elements 110a-110c. A first beam combining element 110a can be arranged to receive the light signals 104a and 104d from lights sources 102a and 102d respectively. The first beam combining element 110a can be configured to combine the light signals 104a and 104d into a first combined signal 104ad. A second beam combining element 110b can be arranged to receive the light signals 104v and 104h from lights sources 102v and 102h respectively. The second beam combining element 110b can be configured to combine the light signals 104v and 104h into a second combined signal 104vh. A third beam combining element 110c can be arranged to receive the combined light signals 104ad and 104vh from beam combining element 110a and 102b respectively. The third beam combining element 110c can be configured to combine the light signals 104ad and 104vh into a combined output signal 106.

The combined signal source 105 can be configured to generate the output signal 106 as a series of light signal pulses. The series of light signal pulses can be transmitted to the optical receiver over the link 150. The received series 152 of light pulses can then be decoded by the optical receiver 160 in order to determine a shared secret.

The series of light signal pulses can include a plurality of light pulses arranged in a specified sequence. Each light pulse can have information encoded thereon that is defined based on the channel (i.e. which of the light sources 102) that transmitted that light pulse at a given time (i.e. at a given position in the sequence of light pulses). Each light pulse emitted by the combined signal source 105 in the output signal 106 can correspond to one of the signal channels (i.e. to one of the light sources 102). Thus, each pulse can have a unique encoding corresponding to the light source 102/channel from which it was transmitted.

The optical transmitter in a quantum key distribution system may randomly select which light signal (i.e. light in which polarization state) to transmit at a given point in time. That is, the light signal to be transmitted at a given point in time may not be pre-defined or pre-selected. Upon receiving a light signal pulse 154, the optical receiver 160 can randomly select a measurement basis (e.g. horizontal/vertical or diagonal/anti-diagonal) in which to measure that particular light signal pulse. This process can be repeated for the entire series 152 of received light signals.

In some examples, the optical transmitter may be configured to include decoy signals in the signal pulses being transmitted. For example, the optical transmitter can define the output pule sequence to include plurality of signal light pulses and a plurality of decoy light pulses. The signal light pulses may be understood as those pulses that include data relating to the generation of an encryption key. The decoy light pulses may be understood as pulses that do not include data relating to the generation of the encryption key.

When a light signal pulse with a polarization state corresponding to a particular measurement basis is measured using a different measurement basis, that light signal pulse cannot carry information to the receiver. For instance, in the example illustrated, a light signal pulse that is polarized in a diagonal (or anti-diagonal) state will equally likely show a horizontal or vertical polarization when measured in a horizontal/vertical basis. By contrast, when a light signal pulse is measured using the correct basis, then the correct measurement result is much more likely to occur.

Once the optical transmitter has completed transmission of the entire series of light signal pulses, the transmitter can identify and publish (e.g. communicate publicly) the correct measurement basis for each light signal pulse. The optical receiver 160 can then identify which of the pulses 154 in the received series 152 of light signal pulses it measured correctly (i.e. in the correct measurement basis). The optical receiver 160 may then generate a shared secret (e.g. a decryption key) using the information from those light signal 154 that were received and measured correctly.

In some cases, the optical receiver 160 may also evaluate the light signal pulses that were measured using the incorrect measurement basis, or light signal pulses that were sent at an alternate intensity level (e.g. the "decoy" pulses). For example, this may allow the optical receiver to detect possible signal losses and/or possible eavesdropping by a third party. As noted above, a signal measured in the incorrect measurement basis should be equally likely to show both polarization states of that basis. Accordingly, if the resultant measurements appear to indicate a bias (e.g. the measurement results in the incorrect measurement basis are not split roughly 50/50), then this may indicate a problem with the transmission such as signal loss and/or eavesdropping.

In the example shown in FIG. 1, the combined signal source 105 generates a combined output signal 106 in which the signal components (e.g. signal pulses) corresponding to each light source 102 are aligned. Accordingly, the received signal series 152 and the received signal components 154 included therein that are detected at the optical receiver 160 remain aligned and are not spatially distinguishable.

However, multi-beam weak coherent pulse sources for quantum key distribution may suffer from spatial misalignment between photon bases (e.g. H/V/A/D polarization states). For example, the combined signal source 105 can suffer due to spatial misalignment between the individual light sources 102 that provide the different encoded signals as shown in FIG. 2. FIG. 2 illustrates an example of the combined signal source 105 where the combined output channel has misaligned signals 106 and 204 corresponding to different lights sources 102 (and thus different encodings).

Given the transmission distances involved in the free space optical link 150, which may reach hundreds or thousands of kilometers, even small optical misalignments may result in distinguishable signal components 154 and 156 in the far field. This can introduce vulnerabilities that may be exploited by eavesdroppers to identify the signals being transmitted. That is, the distinguishable beams 154 and 156 may be used to identify which encoding is transmitted in each signal received by the optical receiver 160.

For example, if spatial information is encoded in the received signal series 152, a third party can intercept the signal components 154 or 156 and identify the data encoded therein based on the spatial information. A third party may derive the photon state based on the distinguishable spatial distribution of the received signal series 152 and thus obtain information about the data being transmitted to the receiver. This can jeopardize the security of the secret being shared.

For example, an eavesdropping third party may intercept a small number of photons from the light signal series 152 (e.g. using a photon number splitting attack). If the encoding of those photons is distinguishable based on a spatial distribution (e.g. as having H/V/A/D polarization), then the intercepting party may obtain information regarding the shared secret being communicated to the optical receiver 160. Accordingly, it may be desirable to develop an optical transmitter that can prevent the light signal pulses 154/156 from being spatially distinguishable.

Referring to FIG. 3, shown therein is an example of an optical relay section 300 that may be used in existing quantum key distribution systems. For example, the optical relay section 300 may be coupled to the output of a combined signal source, such as the combined signal source 105. As shown in FIG. 3, the optical relay section 300 can include lenses 320 and 326 as well as a spatial filter 322. The lenses 320 and 326, as well as spatial filter 322, can be configured to focus and collimate the combined signal referred from the combined signal source 105.

In the example shown in FIG. 3, the lens 320 can receive the combined signal output including combined output signal components 106 and 204 from the signal source 105. The lens 320 can then direct the output signal components 106 and 204 through the spatial filter 322.

In the example shown in FIG. 3, the spatial filter 322 has an aperture 324 with a diameter 325 that is greater than the wavelength of the signal components 106 and 204. As a result, when the misaligned signal components 106 and 204 exit the spatial filter 322, some spatial misalignment can remain. These misaligned signals can pass through the collimator lens 326 and may be directed to the optical receiver 160. In some cases, the collimated signals may also additional optics before exiting the transmitter, e.g. through an optical output assembly such as a telescope assembly and/or optical pointing assemblies. As the output signals remain misaligned, a third party may be able to determine the information encoded on the transmitted signals by evaluating the spatial positioning of the signals transmitted to the receiver 160.

Figure 4:
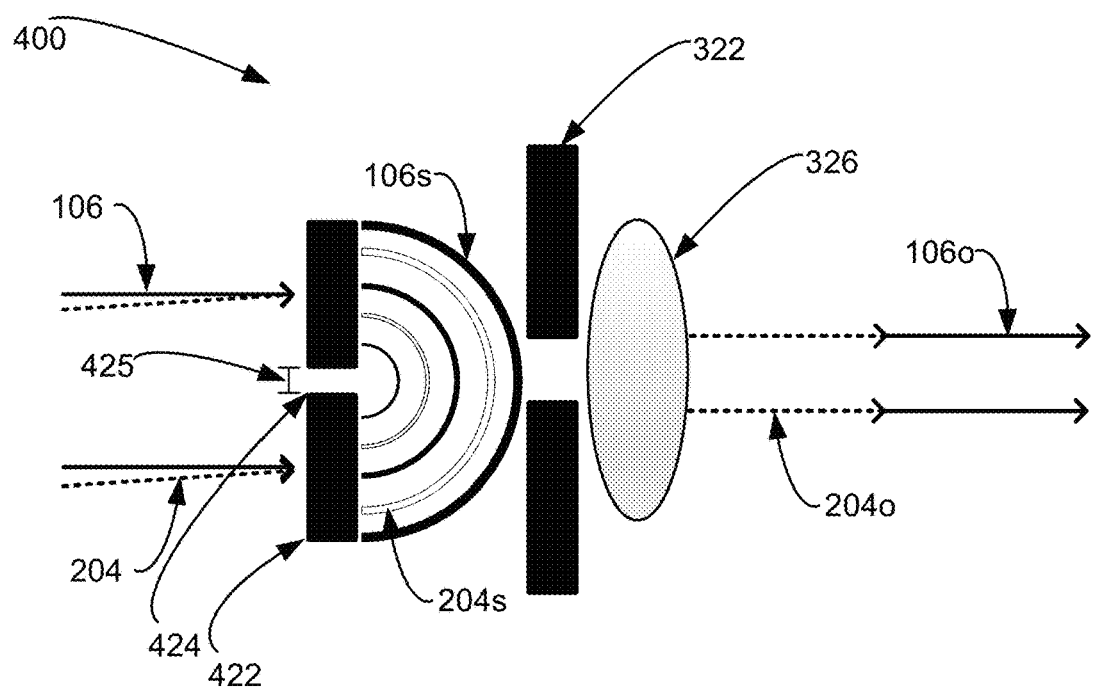
FIG. 4 is a block diagram illustrating an example of a spatial filter in accordance with an embodiment.

Referring to FIG. 4, shown therein is an example of an optical system section 400 in accordance with an embodiment. The optical system section 400 illustrates an example of an optical system that may prevent the signals output by the optical transmitter from being spatially distinguishable. Most notably, the optical system section 400 includes spatial filter 422. Spatial filter 422 has an aperture 424 (e.g. a pinhole aperture) with an aperture diameter 425 less than or equal to the wavelength of the light signal components 106 and 204 (i.e. less than or equal to the wavelength of the light emitted by light sources 102).

The spatial filter 422 generates a single-point diffraction pattern that results from plane waves 106 and 204 being incident upon an aperture (e.g. a pinhole) that has an aperture diameter 425 less than or equal to the wavelength of the plane wave signal components 106 and 204. As a result, corresponding filtered signals in the form of spherical waves 106s and 204s can be emitted by the spatial filter 422. These filtered signals 106s and 204s can then be collimated into a combined output signal in which the output signal components 106o and 204o are spatially indistinguishable.

In the example of optical relay section 400, the filtered signals 106s and 204s can pass through a collimator lens 326 prior to being output. The filtered signals 106s and 204s may also pass through a secondary spatial filter 322 positioned between the spatial filter 422 and the collimator lens 326. The secondary spatial filter 322 may convert the filtered signals back to plane waves in order to ensure that the filtered signals can be completely collimated for transmission to the optical receiver 160.

Figure 5:
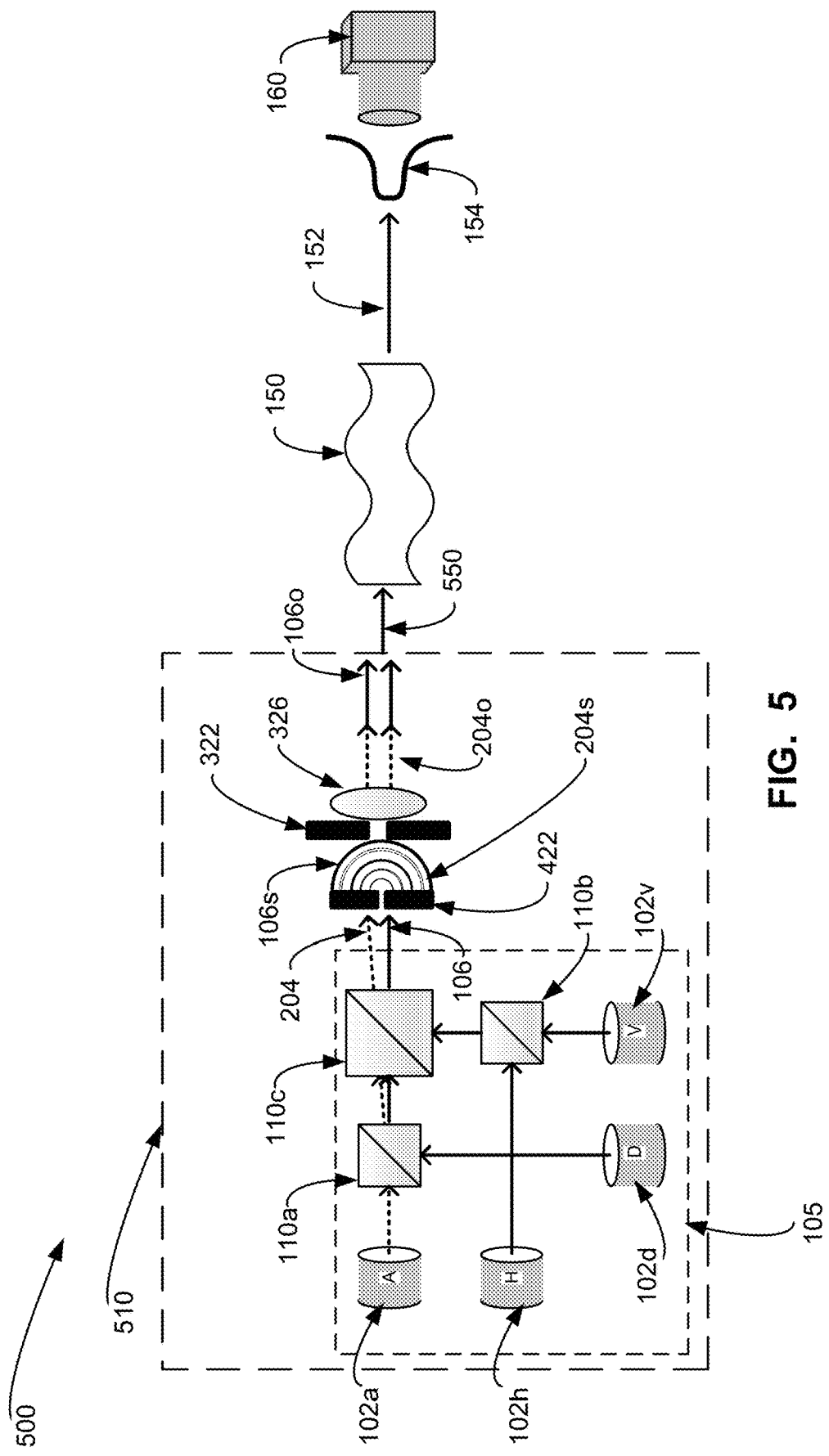
FIG. 5 is a block diagram of an optical communication system including the example spatial filter of FIG. 4 in accordance with an embodiment.

FIG. 5 illustrates a quantum key distribution system 500 in which the optical relay section 400 is implemented as part of an optical transmitter 510. As shown in the example of FIG. 5, the optical relay section 400 (and thus spatial filter 422) is coupled to the output of the combined signal source 105. Accordingly, the optical relay section 400 may ensure that any unaligned or misaligned light signals (e.g. light signal 204) can be rendered spatially indistinguishable from the other light signal components 106 when output from the optical transmitter 510.

The optical transmitter 510 is an example of an optical signal source that may be configured for use in quantum key distribution. In particular, the optical transmitter 510 may be advantageous for quantum key distribution systems that communicate through a free space link 150.

As illustrated, the optical transmitter 510 includes a combined signal source 105 with a plurality of light sources 102 (also referred to as light emitting elements). The combined signal source may also be referred to in some cases as a weak coherent pulse source or faint pulse source. Each light source 102 can emit a corresponding light signal 104 as shown in FIG. 1. The combined signal source 105 also include a beam combiner optically coupled to the light sources 102. As explained above, the beam combiner can include one or more beam combining elements, such as the example beam combining elements 110 illustrated. The light signals 104 can be combined into a combined output signal through the beam combiner. For example, the light signals may be combined into a single substantially collimated (albeit a non-focused, weakly diverging beam) combined light signal. This combined signal can be directed to a single spatial filter (e.g. a circular pinhole filter or a graded intensity mask such as an apodized Gaussian intensity mask).

In the example illustrated, the (collimated) combined light signal includes misaligned light signal components 106 and 204. However, as shown in FIG. 5, spatial filter 422 can be optically coupled to the beam combiner. The combined light signal from the beam combiner can be received by the spatial filter 422. The spatial filter 422 can include an aperture 424 having an aperture diameter 425 less than or equal to the associated wavelength of the light signals emitted by the light sources 102. As explained above, the spatial filter 422 can thus emit a filtered light signal in which the signal components 204s and 106s are not spatially distinguishable.

The filtered light signal can then be received by a collimator coupled to the spatial filter 422. The collimator can be configured to emit a collimated light signal. The collimated light signal can then be directed to an output aperture. The output aperture may be controlled to output the collimated light signal towards an optical receiver 160.

As noted above, a secondary spatial filter 322 can be coupled to a collimator lens 326. The secondary spatial filter 322 can be optically coupled to the spatial filter 422 in order to convert the spherical waves 106s/240s back into plane waves to allow the output signals to be fully collimated. These plane waves can then be collimated by lens 326. The collimated signal sequence can then be transmitted towards the optical receiver 160 (e.g. through the use of relay optics, a pointing assembly and other optical elements usable to direct the collimated signal sequence to the optical receiver.

The combined signal beams (i.e. signal components 204 and 106) incident upon the spatial filter 422 can be converted from a plane wave with a specific spatial component (e.g. direction of propagation) into spatially indistinguishable spherical waves (i.e. signal components 204s and 106s) originating at the spatial filter 422 as per the Huygens-Fresnel wave-propagation model.

In some examples, the spherical waves (e.g. signal components 204s and 106s) exiting the spatial filter 422 may be restricted to a certain divergence (e.g. to a diverging beam) using optical baffling such as field stops. This may limit the divergence of the spherical waves to a required numerical aperture. The diverging beam may then be expanded and collimated (e.g. using filter 322 and lens 326) in order to provide a collimated signal (e.g. a weakly diverging beam) that may be suitable for a free-space optical link 150. The collimated signal may be output through an aperture in the optical transmitter, in some cases after passing through additional output optics such as a telescope assembly and pointing optics.

The optical transmitter 510 including spatial filter 422 can address a particular type of side-channel attack associated with free-space optical communications, and in particular, free-space quantum key distribution in which the information being transmitted to the optical receiver may be extracted based on spatially-distinguishable photon states. Accordingly, the optical transmitter 510 can provide a quantum key distribution source with spatial side-channel immunity (i.e. a quantum key distribution source free from side-channel attacks based on spatially-distinguishable photon states)

As noted above, the optical transmitter 510 relies on the use of a spatial filter 422 (e.g. a circular pinhole filter or a graded intensity mask such as an apodized Gaussian intensity mask) configured to avoid spatial distinguishability of the signal components being transmitted. The spatial filter 422 includes an aperture 424 with an aperture diameter (or pinhole size) 425 that is at most equal to the wavelength of the light being transmitted. In many cases, the aperture diameter 425 may be less than the wavelength of the light being transmitted. For example, the aperture diameter 425 may be 1 micron while the wavelength of light being transmitter is on the order of 100 microns.

By contrast, in optical transmitters employing spatial filters with larger aperture (as in the optical relay section 300), the filtered signal components can still retain some spatial information (i.e. a signal propagation direction) even though the signal channels from all of the light sources pass through the same filter 322. Accordingly, if the light sources 102 are not properly aligned it may be possible to distinguish the encoding using this retained spatial information.

By contrast, with the filter 422, all of the signal pulses that pass through the filter 422 are transmitted as spherical waves emitted from a point source (i.e. aperture 424). Beams exiting the spatial filter 422 are emitted as indistinguishable spherical waves precisely because the aperture is dimensioned to be less than or equal to the wave-length of the transmitted signal. This prevents any spatial information from being retained in the filtered light signal. However, a lot of the light from the light sources 102 may be lost as a result of the filtering performed by the filter 422.

In a conventional optical communications system, the use of the spatial filter 422 would be completely impractical as the spatial filter 422 will introduce substantial optical losses into the system. For example, for a 5 mm collimated beam transmitted at a wavelength of 800 nm, the transmission through the spatial filter 422 may be as low as 25 parts-per-billion (e.g. −75 dB of optical loss). However, in a quantum key distribution system based on weak coherent pulses (e.g. using the BB84 QKD protocol), the optical transmission of elements within the quantum source is not critical. Rather, the intensity of the weak coherent pulses emitted by the light sources 102 can be adjusted in order to ensure that, at the optical terminal level (i.e. in the output signal sequence), an average of less than 1 photon per pulse leaves the terminal. That is, the substantial losses through the spatial filter are ultimately immaterial to the quality of the link for the purposes of quantum key exchange since the security of the link depends on the emission of fewer than 1 average photon per pulse at the exit of the transmitting terminal (i.e. at the output of transmitter 510), not at the transmitting source (i.e. source 105) within the terminal.

As noted, the intensity of the output signal sequence 550 transmitted by the optical transmitter 510 can average one photon per pulse or even less. For example, the output signal sequence 550 may average about half a photon per pulse (e.g. for every two pulses in the output signal sequence 550, a first pulse may include one photon while a second pulse has zero photons). In some cases, the output signal sequence 550 may be transmitted with an average of less than 0.5 photons per pulse (e.g. 1/10 photons per pulse).

For instance, in the case where the spatial filter has optical transmission of 25 parts per billion, the intensity of the combined source 105 (i.e. of the light sources 102) can be adjusted such that approximately <39,062,500 photons per pulse enter the spatial filter 422 resulting in the transmission of less than 1 photon per pulse.

While the output beams from the spatial filter 422 will be spatially indistinguishable, they may still be distinguishable by amplitude. For example, optical misalignment between two beams entering the spatial filter 422 can result in a reduction in amplitude of the transmitted beam. This reduction in amplitude is governed by the cross-sectional area of the aperture 424 as viewed by the incident beam.

Accordingly, in some examples the optical transmitter 510 may be configured to adjust the intensity of the light emitted by the light sources 102 to account for the variations in amplitude. This may ensure that the pulses in the signal sequence 152 received by the optical receiver are also not distinguishable based on amplitude.

For example, where the spherical waves 106s/204s exiting the spatial filter 422 are distinguishable by amplitude (e.g. because beam 106 is better-aligned to the spatial filter 422 than beam 204), the relative amplitude of the light emitted by the light sources 102 can be adjusted to render the amplitude of the spherical waves 106s/204s indistinguishable (e.g. the output power of the laser diode emitting beam 204 can be increased such that the intensity of beam 204 leaving the aperture 424 is equivalent to that of beam 106 leaving the aperture 424).

In some examples, the transmittance through the spatial filter 422 may be known (e.g. calibrated) in advance of use and the power of the emitting light sources 102 can be adjusted such that a desired average number of photons per pulse is provided. For example, the power of the emitting light sources 102 may be adjusted such that on average 0.5 photons per pulse leave the aperture 424 and are collimated into the spatially indistinguishable collimated beam that includes signal components 204o/106o. Alternatively, the power of light sources 102 may be adjusted such that on average 0.5 photons per pulse are transmitted to the free-space channel 150 as output signal 550.

In some examples, the optical transmitter 510 may be configured to actively monitor/measure the transmittance through the spatial filter 422 (or at the output) during use (e.g. by splitting off some portion of the optical power after transmission through the aperture 424). The intensity of light emitted by the light sources 102 may then be adjusted (in some cases continually) such that a desired average number of photons per pulse is provided. For example, the power of the emitting light sources 102 may be adjusted such that on average 0.5 photons per pulse leave the aperture 424 and are collimated into the spatially indistinguishable collimated beam that includes signal components 204o/106o. Alternatively, the power of light sources 102 may be adjusted such that on average 0.5 photons per pulse are transmitted to the free-space channel 150 as output signal 550.

As noted above, the output signal sequence 550 transmitted by the optical transmitter 510 may be defined to include a plurality of signal light pulses and a plurality of decoy light pulses. The optical transmitter 510 may define the sequence of light pulses so that the desired average number of photons per pulse includes a desired signal average number of photons per signal light pulse and a desired decoy average number of photons per decoy light pulse. The desired signal average number may be different from the desired decoy average number. For example, the desired average number of photons per pulse may include multiple levels for "signal" and "decoy" states, (e.g. 0.5 "signal" photons per pulse and 0.1 "decoy" photons per pulse).

The optical transmitter 510 may include additional elements such as optical components and other components, such as processors and optical detectors, not shown in FIG. 5. For example, the optical transmitter may include an optical detector (e.g. a photoreceptor such as a photodiode) and one or more processors usable to monitor transmittance through the spatial filter 422. Various types of optical detectors may be used by optical transmitter 510. Similarly, the processor may be implemented by one or more processors that are configured to execute instructions stored in a memory (e.g. random-access memory (RAM), read only memory (ROM), hard disk, optical disc, subscriber identity module (SIM) card, memory stick, secure digital (SD) memory card, on-processor cache, and the like). Alternatively, the processor may be implemented using dedicated circuitry, such as a programmed field-programmable gate array (FPGA), a graphical processing unit (GPU), or an application-specific integrated circuit (ASIC).

The optical transmitter 510 described herein can eliminate the technical challenge of co-aligning four or more collimated beams, to produce spatially indistinguishable channels and replaces it with the challenge of producing channels that are indistinguishable by intensity. The requirements for co-alignment between beams remains, but is greatly simplified, because beam misalignment to the aperture 424 of spatial filter 422 results only in a variation of intensity according to $T'=T \cos(\theta)$ where T' is the reduced transmission, T is the transmission at normal incidence, and θ is the angular misalignment, where θ is likely to be measured in micro-radians.

In comparison with systems which do not employ the spatial filter 422 (where the aperture is less than or equal to the wavelength of light being transmitted), the misalignment tolerance for the optical transmitter using spatial filter 422 is substantially larger.

For example, two beams may differ in angle by 2 mrad, and may propagate over a distance of 1000 km to the optical receiver 160. In this example, the two misaligned beams will be separated by 2 km by the time they reach the optical receiver 160. This is an extremely large amount of separation for optical beams which are typically extremely tight and may produce spot sizes of 50 m or less. Conversely, in the case of the optical transmitter 510, the misaligned beam will pick up an additional loss term as it transmits through the spatial filter 422—due to the reduced cross-section of the aperture 424. The reduced transmission through the aperture 424 is given by T'=T cos(θ) where T' is the reduced transmission, T is the transmission at normal incidence, and θ is the angular misalignment. Assuming an initial T=1, and the same θ=2 mrad initial misalignment we can see that T'=0.999998. More specifically, if the initial transmission of the aperture 424 was 25 parts per billion, then the transmission for the misaligned beam would be 24.99995 parts per billion. This difference can be easily accounted for by adjusting the relative intensity of the light transmitted by the respective light sources.

The spatial filter 422 may be manufactured in various ways. For example, the aperture 424 may be fabricated using lithographic patterning and etching of an optically reflective surface (e.g. Nickel, Chrome, etc.) on a substrate (e.g. a silicon, fused silica, or other wafer or chip). These processes may include but are not limited to deep-UV lithography, ion beam etching, electron beam etching, or electron beam lithography. For example, deep-UV lithography may be used to define a circular etch mask for a pinhole aperture of diameter D<λ. The etch mask may then be applied in order to define the pinhole in an optically-reflective material (e.g. chrome, nickel, gold, silver, etc.) which has been deposited over the surface and is then selectively removed by etching.

The optical transmitter 510 may be configured for use in an optical terminal performing quantum key distribution (QKD) based on the BB84 key exchange protocol (and other similar protocols). The optical transmitter 510 may define weak coherent pulse or "faint pulse" source that can include light emitting elements 102 (e.g. lasers, LEDs, etc.), beam-combining elements 110 (e.g. polarizing beam combiners, non-polarizing beam combiners etc.), focusing and collimating elements (e.g. filter 322 and lens 326) and a spatial filter 422 (e.g. a pinhole filter) with an aperture diameter 425 less than or equal to the wavelength of light emitted by the light sources 102. This optical transmitter 510 can be used to perform quantum key distribution immune from side channel attacks based on spatial non-uniformity of transmitted photon states.

Although the example quantum key distribution system 500 and optical transmitter 510 have been described herein in the context of a free space optical link 150, the optical transmitter 510 may also be advantageously employed in fiber-optic communication systems that may include a significant spatial component (e.g. systems using transmission through a multi-mode fiber channel, rather than a free-space channel).

Figure 6:
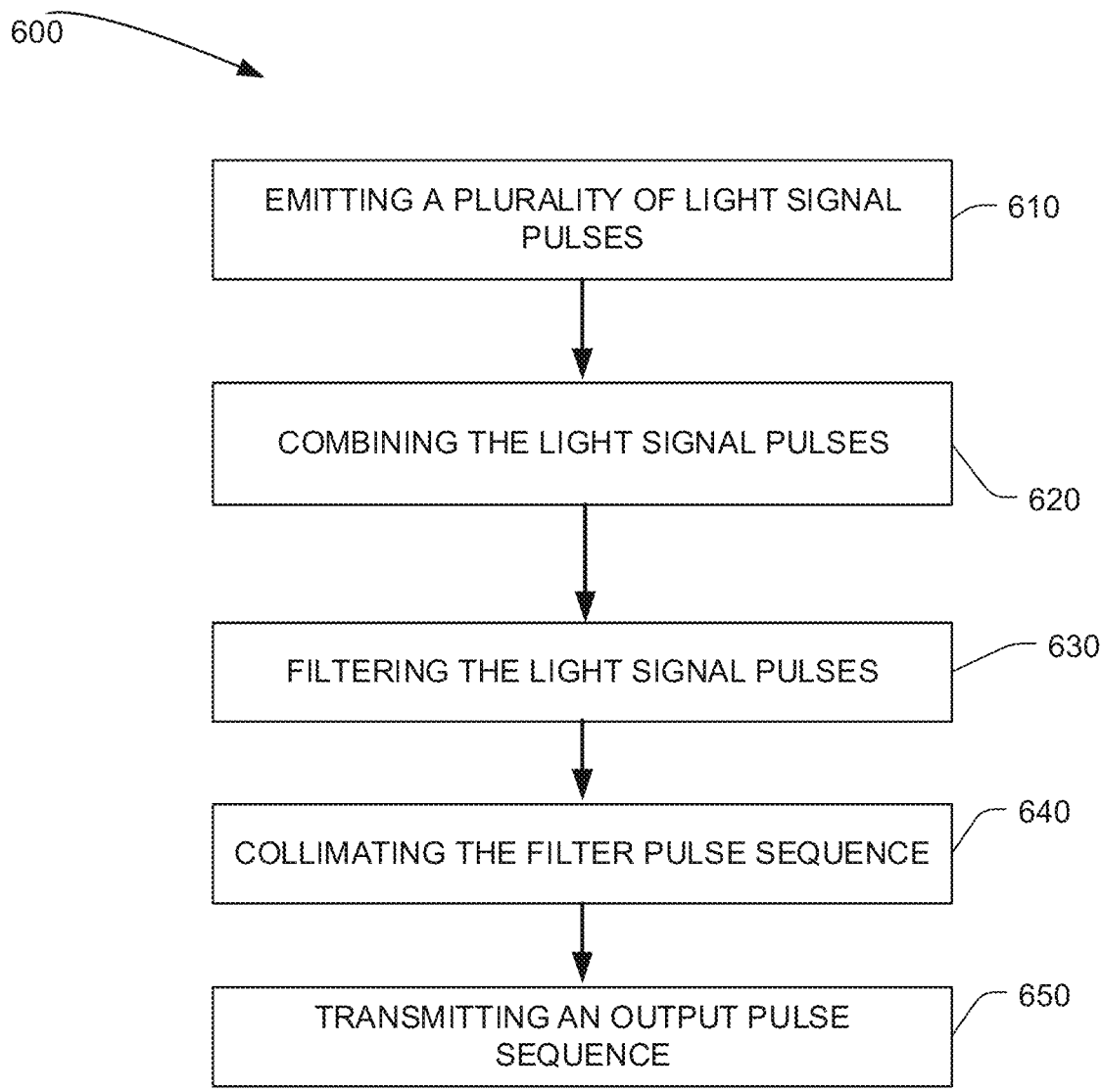
FIG. 6 is a flowchart illustrating an example of a key distribution method in accordance with an embodiment.

Referring now to FIG. 6, shown therein is an example process 600 for quantum key distribution. Process 600 is an example quantum key distribution process that may enable quantum key distribution over free space while being immune from side channel attacks based on spatial non-uniformity of transmitted photon states. Process 600 may be implemented using various optical transmitters employing spatial filters with an aperture diameter less than or equal to (i.e. at most equal to) the wavelength of the light being transmitter, such as the example optical transmitter 510 described herein above.

At 610, a plurality of light signal pulses can be emitted. Each light signal pulse may be emitted with a corresponding encoding. For example, each light signal pulse may be emitted with a specific polarization state. The plurality of light signal pulses may correspond to a plurality of light source channels, where each light source channel has a unique encoding associated therewith.

The plurality of light signal pulses emitted at 610 can include signal pulses with at least four different corresponding encodings (e.g. four different polarization states). Each of the light signal pulses may be emitted with the same wavelength.

At 620, the plurality of light signal pulses may be combined into a combined pulse sequence. The plurality of light signal pulses may be directed through one or more beam combining elements usable to combine the light signal pulses into a combined, substantially collimated, beam (e.g. a weakly diverging light beam).

At 630, the combined pulse sequence may be filtered through a spatial filter having an aperture diameter that is less than or equal to the wavelength of the light emitted at 610. The filter may result in a filter light signal sequence.

The filtering can also convert the combined pulse sequence from plane waves into spherical waves. The spherical waves can originate from the aperture of the spatial filter. This may ensure that any spatial information included in the plane waves in the combined pulse sequence is removed from the spherical waves.

At 640, the filtered light signal sequence can be collimated into a collimated pulse sequence. The filtered light signal sequence may be directed through one or more optical elements (e.g. focusing elements, optical baffling, additional spatial filters etc.) operable to convert the spherical waves emitted by the spatial filtered into a collimated pulse sequence that is a weakly diverging beam.

At 650, the collimated pulse sequence can be transmitted towards an optical receiver as an output pulse sequence. The collimated pulse sequence may be routed through various additional optical elements, such as telescope assemblies and pointing assemblies for example, in order to output the output pulse sequence. In some examples, the output pulse sequence may be transmitted towards the optical receiver through free space. The pulses in the output pulse sequence may be spatially indistinguishable due to the spatial filtering performed at 630. This may prevent third parties from obtaining information due to the spatial location of the pulses transmitted.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. An optical transmitter configured for quantum key distribution, the optical transmitter comprising:
   (a) a plurality of light sources, each light source configured to emit a corresponding light signal with the same specified wavelength, wherein each light source is configured to emit the corresponding light signal with a unique encoding;
   (b) a beam combiner optically coupled to the plurality of light sources, the beam combiner arranged to receive the light signals from the plurality of light sources and to combine the received light signals into a combined light signal;
   (c) a spatial filter optically coupled to the beam combiner, the spatial filter including an aperture arranged to receive the combined light signal and to emit a filtered light signal, wherein the aperture has an aperture diameter less than or equal to the specified wavelength;
   (d) a collimator optically coupled to the spatial filter, the collimator configured to receive the filtered light signal and to emit a collimated light signal; and
   (e) an output aperture configured to receive the collimated light signal and to output the collimated light signal as an output light signal towards an optical receiver.

2. The optical transmitter of claim 1, wherein the unique encoding comprises at least one of a different polarization or a different time-bin.

3. The optical transmitter of claim 1, wherein the spatial filter is one of a pinhole filter or a graded intensity mask.

4. The optical transmitter of claim 1, wherein the optical transmitter is configured to output the output light signal as a sequence of light pulses.

5. The optical transmitter of claim 4, wherein the optical transmitter is configured to transmit the sequence of light pulses with each light pulse indistinguishable from each other light pulse both spatially and by amplitude.

6. The optical transmitter of claim 1, wherein the spatial filter is configured to receive the combined light signal as a combined plane wave or Gaussian beam and to convert the combined light signal into a sequence of spherical waves originating at the spatial filter.

7. The optical transmitter of claim 6, wherein the spherical waves are spatially indistinguishable.

8. The optical transmitter of claim 1, wherein a relative amplitude of the corresponding light signals emitted by the plurality of light sources is adjustable.

9. The optical transmitter of claim 8, wherein an absolute amplitude of each light source is adjustable.

10. The optical transmitter of claim 8, further comprising a processor and a photoreceptor operable to monitor an amplitude of the filtered light signal corresponding to each light source and to adjust the amplitude of the plurality of light sources based on the monitored amplitude.

11. The optical transmitter of claim 1, further comprising optical baffling coupled to the spatial filter, wherein the optical baffling is configured to limit a divergence of the filtered light signal emitted by the spatial filter.

12. The optical transmitter of claim 1, further comprising a secondary spatial filter optically coupled between the spatial filter and the collimator.

13. A key distribution method comprising:
   (a) emitting a plurality of light signal pulses, wherein each light signal pulse is emitted with a corresponding encoding and the plurality of light signal pulses includes signal pulses with at least four different corresponding encodings, and wherein each light signal pulse is emitted with the same wavelength;
   (b) combining the plurality of light signal pulses into a combined pulse sequence;
   (c) filtering the combined pulse sequence through a spatial filter having an aperture diameter that is less than or equal to the specified wavelength to generate a filtered light signal sequence; and
   (d) collimating the filtered light signal sequence into a collimated pulse sequence.

14. The key distribution method of claim 13, further comprising transmitting the collimated pulse sequence towards an optical receiver as an output pulse sequence.

15. The key distribution method of claim 14, further comprising adjusting a power of the plurality of light sources to provide a desired average number of photons per pulse in the output pulse sequence.

16. The key distribution method of claim 13, further comprising adjusting a power of the plurality of light sources to provide a desired average number of photons per pulse in the collimated pulse sequence.

17. The key distribution method of claim 14, further comprising monitoring an average number of photons per pulse in the output pulse sequence and adjusting the power of one or more light sources in order to maintain the average number of photons per pulse at a desired average number of photons per pulse.

18. The key distribution method of claim 13, further comprising monitoring an average number of photons per pulse in the collimated pulse sequence and adjusting the power of one or more light sources in order to maintain the average number of photons per pulse at a desired average number of photons per pulse.

19. The key distribution method of claim 13, wherein the corresponding encoding for at least some of the light pulses comprises at least one of a corresponding polarization state or a corresponding time-bin.

20. An optical transmitter comprising:
   (a) a plurality of light sources, each light source configured to emit a corresponding light signal with the same specified wavelength, wherein each light source element is configured to emit the corresponding light signal with a unique encoding; and
   (b) a spatial filter having a filter aperture with a diameter less than or equal to the specified wavelength;
   wherein the optical transmitter is configured to output a plurality of pulses of light that are generated by the light sources and directed through the spatial filter, wherein the plurality of pulses of light average at most one photon per pulse.

* * * * *